(12) United States Patent
Pirtle

(10) Patent No.: US 10,500,824 B2
(45) Date of Patent: Dec. 10, 2019

(54) STRETCH FILMS CONTAINING RANDOM COPOLYMER POLYPROPYLENE RESINS IN ADJACENT LAYERS OF A NANOLAYER STRUCTURE

(71) Applicant: Paragon Films, Inc., Broken Arrow, OK (US)

(72) Inventor: Shaun Eugene Pirtle, Coweta, OK (US)

(73) Assignee: PARAGON FILMS, INC., Broken Arrow, OK (US)

( * ) Notice: Subject to any disclaimer, the term of this patent is extended or adjusted under 35 U.S.C. 154(b) by 733 days.

(21) Appl. No.: 15/133,349

(22) Filed: Apr. 20, 2016

(65) Prior Publication Data

US 2016/0229163 A1    Aug. 11, 2016

Related U.S. Application Data

(62) Division of application No. 14/267,544, filed on May 1, 2014, now Pat. No. 9,346,247.

(Continued)

(51) Int. Cl.
   *B32B 27/32* (2006.01)
   *B29C 47/80* (2006.01)
   (Continued)

(52) U.S. Cl.
   CPC ............ *B32B 27/32* (2013.01); *B29C 48/001* (2019.02); *B29C 48/08* (2019.02); *B29C 48/255* (2019.02);
   (Continued)

(58) Field of Classification Search
   None
   See application file for complete search history.

(56) References Cited

U.S. PATENT DOCUMENTS 3,761,211 A    9/1973 Parkinson
4,152,387 A    5/1979 Cloeren
(Continued)

FOREIGN PATENT DOCUMENTS

| EP | 0754535 A1 | 1/1997 |
|---|---|---|
| WO | 2005/065945 A1 | 7/2005 |
| WO | 2010/015402 A1 | 2/2010 |

OTHER PUBLICATIONS

Notification of Transmittal of the International Search Report and the Written Opinion of the International Searching Authority, or the Declaration issued in the corresponding PCT International Application No. PCT/US2014/036403, dated Jul. 7, 2014, 10 pages.

(Continued)

*Primary Examiner* — Fred M Teskin
(74) *Attorney, Agent, or Firm* — Raymond R. Ferrerra; Adams and Reese LLP

(57) ABSTRACT

A method of producing a stretch film includes at least: extruding a first random copolymer polypropylene (RCPP) resin from a first extruder at a first temperature to at least one primary channel inside of a feedblock; extruding a second RCPP resin from a second extruder at a second temperature to at least one secondary channel, wherein said second temperature is greater than said first temperature; combining the first RCPP resin and the second RCPP resin to create a layered stream using a combining adapter disposed in communication with the feedblock; passing said layered stream from the combining adapter to a die; and passing the layered stream through said die to a casting unit. A multi-layered stretch film includes at least one nanolayer section, the nanolayer section comprising alternating substantially adjacent layers of a first random copolymer polypropylene (RCPP) resin and a second RCPP resin.

8 Claims, 1 Drawing Sheet

Related U.S. Application Data

(60) Provisional application No. 61/818,154, filed on May 1, 2013.

(51) Int. Cl.
| | | |
|---|---|---|
| *B29C 47/70* | (2006.01) | |
| *B29C 47/00* | (2006.01) | |
| *B32B 27/08* | (2006.01) | |
| *B32B 7/02* | (2019.01) | |
| *B29C 48/00* | (2019.01) | |
| *B29C 48/08* | (2019.01) | |
| *B29C 48/71* | (2019.01) | |
| *B29C 48/255* | (2019.01) | |
| *B29C 48/875* | (2019.01) | |
| *C08L 23/14* | (2006.01) | |
| *B82Y 30/00* | (2011.01) | |
| *B29C 39/20* | (2006.01) | |
| *B29C 48/21* | (2019.01) | |
| *B29C 48/49* | (2019.01) | |
| *B29C 48/70* | (2019.01) | |
| *B29C 48/695* | (2019.01) | |
| *B29C 48/88* | (2019.01) | |
| *B29K 23/00* | (2006.01) | |

(52) U.S. Cl.
CPC ............ *B29C 48/71* (2019.02); *B29C 48/875* (2019.02); *B32B 7/02* (2013.01); *B32B 27/08* (2013.01); *B32B 27/327* (2013.01); *B29C 39/203* (2013.01); *B29C 48/21* (2019.02); *B29C 48/49* (2019.02); *B29C 48/695* (2019.02); *B29C 48/70* (2019.02); *B29C 48/9145* (2019.02); *B29K 2023/14* (2013.01); *B29K 2823/14* (2013.01); *B32B 2250/242* (2013.01); *B32B 2250/42* (2013.01); *B32B 2307/514* (2013.01); *B32B 2323/10* (2013.01); *B82Y 30/00* (2013.01); *C08L 23/14* (2013.01); *C08L 23/142* (2013.01); *C08L 23/145* (2013.01); *C08L 23/147* (2013.01); *Y10T 428/2495* (2015.01); *Y10T 428/31913* (2015.04)

(56) References Cited

U.S. PATENT DOCUMENTS

| | | |
|---|---|---|
| 4,297,415 A | 10/1981 | Ward et al. |
| 4,642,269 A | 2/1987 | Kohyama et al. |
| 5,011,719 A | 4/1991 | Gehrke et al. |
| 5,085,927 A | 2/1992 | Dohrer |
| 5,208,096 A | 5/1993 | Dohrer |
| 5,419,934 A | 5/1995 | Wilson |
| 5,489,454 A | 2/1996 | Peiffer et al. |
| 5,614,297 A | 3/1997 | Velazquez |
| 5,709,937 A | 1/1998 | Adams et al. |
| 5,741,565 A | 4/1998 | Coosemans et al. |
| 5,888,648 A | 3/1999 | Donovan et al. |
| 5,902,684 A | 5/1999 | Bullard et al. |
| 6,083,611 A | 7/2000 | Eichbauer et al. |
| 6,409,494 B1 | 6/2002 | Voss |
| 6,750,284 B1 | 6/2004 | Dharmarajan et al. |
| 7,655,317 B2 | 2/2010 | Brant et al. |
| 8,105,686 B2 | 1/2012 | Blackwell et al. |
| 8,562,885 B2 | 10/2013 | Dooley et al. |
| 8,927,108 B2 | 1/2015 | Fiscus et al. |
| 2002/0102423 A1 | 8/2002 | Shibata et al. |
| 2003/0049436 A1 | 3/2003 | Hager et al. |
| 2003/0099792 A1 | 5/2003 | Andersson et al. |
| 2004/0033349 A1 | 2/2004 | Henderson |
| 2006/0062980 A1 | 3/2006 | Iyer |
| 2009/0104424 A1 | 4/2009 | Manrique et al. |
| 2010/0081743 A1 | 4/2010 | Patkar et al. |
| 2010/0093939 A1 | 4/2010 | Gahleitner et al. |
| 2010/0215879 A1 | 8/2010 | Dooley et al. |
| 2011/0039098 A1 | 2/2011 | Forloni et al. |
| 2013/0243894 A1 | 9/2013 | Schirmer |
| 2014/0363600 A1 | 12/2014 | Dooley et al. |

OTHER PUBLICATIONS

Parent U.S. Appl. No. 14/267,544, 2 pages.

STRETCH FILMS CONTAINING RANDOM COPOLYMER POLYPROPYLENE RESINS IN ADJACENT LAYERS OF A NANOLAYER STRUCTURE

FIELD

The present invention relates generally to stretch films and methods for producing stretch films, and in a particular though non-limiting embodiment, to stretch films and methods for producing stretch films wherein random copolymer polypropylene resin nanolayers are incorporated into the film.

BACKGROUND

Stretch films are widely used in a variety of bundling and packaging applications. For example, stretch films have become a common method of securing bulky loads such as boxes, merchandise, produce, equipment, parts, and other similar items on pallets. Such films are typically made from various polyethylene resins and are single or multilayer products. An additive known as a cling agent is frequently used to ensure that adjacent layers of film will cling to each other.

Typical stretch films are comprised of multiple discrete layers that allow for the overall performance of the film to be modified by the use of differentiated resins in any of the internal or external layers of the structure. The majority of high-performance, thin gauge machine stretch films typically incorporate high levels (e.g., greater than 50% by weight) metallocene linear low density polyethylene resins (m-LLDPE) in the structure. The m-LLDPE resins offer enhanced stretch and puncture performance over Ziegler-Natta (ZN) LLDPE resins, thereby allowing the production of thinner, more durable films.

Although films incorporating a high level of m-LLDPE resin benefit from elongation and puncture improvements versus conventional ZN LLDPE resins, the m-LLDPE products are still susceptible to catastrophic failure when penetrated. Catastrophic failure is defined as a complete separation of the film under normal stretch wrapping conditions due to a minimal penetration. This accelerated failure mechanism is generally not observed in films incorporating a high level of ZN LLDPE resin, but can be a concern with films having a high level of m-LLDPE resin.

Catastrophic failure typically occurs at a speed that prevents the film from establishing and maintaining a film web between the pallet wrapper and the pallet being wrapped.

There is, therefore, a long-standing yet unmet need for stretch films which incorporate a high level of m-LLDPE resin, while avoiding catastrophic failure. There is a further unmet need for methods of producing such films.

SUMMARY

Methods and apparatus of producing multi-layered stretch films, and compositions of such films, are provided herein. A method of producing a multi-layered stretch film includes at least the following steps: extruding a first random copolymer polypropylene (RCPP) resin from a first extruder at a first temperature to at least one primary channel inside of a feedblock; extruding a second RCPP resin from a second extruder at a second temperature to at least one secondary channel inside of the feedblock, wherein said second temperature is greater than said first temperature, thereby creating a relative temperature gradient; combining the first RCPP resin from the at least one primary channel and the second RCPP resin from the at least one secondary channel to create a layered stream using a combining adapter disposed in communication with the feedblock; passing said layered stream from the combining adapter to a die; and passing the layered stream through said die to a casting unit, thereby forming a film web.

A multi-layered stretch film includes at least one nanolayer section, the nanolayer section comprising alternating substantially adjacent layers of a first random copolymer polypropylene (RCPP) resin and a second RCPP resin.

BRIEF DESCRIPTION OF THE DRAWINGS

For a further understanding of the nature, objects and advantages of the present invention, reference should be had to the following descriptions read in conjunction with the following drawings.

DETAILED DESCRIPTION

Figure 1:
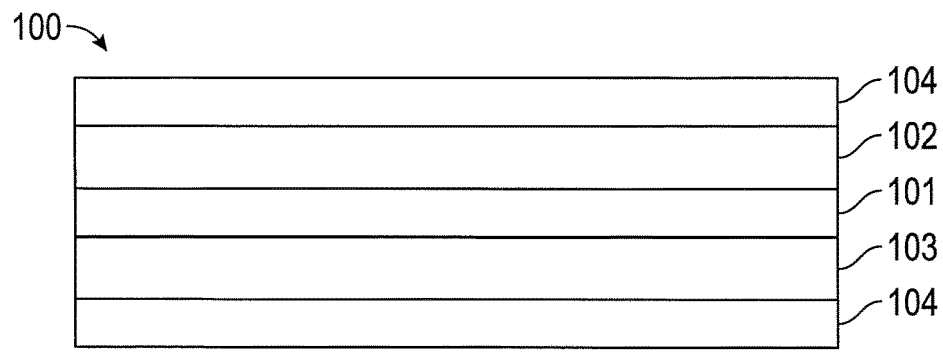
FIG. 1 illustrates a multi-layered stretch film incorporating a discrete random copolymer polypropylene layer according to example embodiments.

The following description is not to be taken in a limiting sense, but is made merely for the purpose of illustrating example embodiments.

According to example embodiments, a discrete layer of polypropylene (including random copolymer polypropylene, referred to herein as "RCPP") resin is incorporated into multi-layered films comprising high percentages of metallocene-catalyzed linear low density polyethylene (m-LLDPE). A high percentage of m-LLDPE, as used herein, is defined as a multi-layered film comprising at least about 50% m-LLDPE resin by weight. RCPP resins are thermoplastic resins produced through the polymerization of propylene, with ethylene links introduced in the polymer chain.

In certain embodiments, a nanolayer feedblock is used in producing a stretch film. "Nanolayer" is a term known by those with ordinary skill in the art of multi-layered stretch films. Taking for example, an example embodiment comprises a 10 micron (10 μm) thick multi-layered film, in which the nanolayer structure comprises 22 discrete, alternately-stacked layers, with the total nanolayer structure representing about 20% of the overall 10 micron-thick film. In this example, each of the 22 "nanolayers" have a thickness of about 100 nanometers (100 nm). Upon being applied to the load, and being stretched between about 150% and about 250%, each of the 22 nanolayers in the nanolayer structure ranges from about 28.6 nm to about 40 nm thick (and, therefore, in the nanometer range of thickness).

In other embodiments, RCPP resins are incorporated into a nanolayer section of the film, as opposed to having a discrete layer of RCPP resin in the multi-layered film. According to example embodiments, the nanolayer configuration alternately stacks RCPP resin layers from at least two (2) separate extrusion sources at different temperatures. In further embodiments, the film has more than one (1) nanolayer section.

In certain embodiments, the RCPP resins from the two extruders have different melt flow rates, different melting points, or different percentages ethylene, or any combination of these properties. In further embodiments, the RCPP resins are substantially the same, but are extruded at different temperatures.

According to one example embodiment, the adjacent layers of RCPP resins are extruded with a significant temperature gradient (e.g., a temperature difference of greater than about 80° F.). In further embodiments, the temperature gradient for the extruded RCPP resins is at least 30° F. According to example embodiments, when the RCPP layers are extruded with a temperature gradient of at least about 30° F., the resulting films have comparable puncture resistance and relative extensibility as compared to similar structures having a discrete layer of RCPP resin.

In some embodiments, one RCPP resin is extruded at a temperature ranging from about 480° F. to about 560° F. In other embodiments, the second RCPP resin is extruded at a temperature ranging from about 510° F. to about 650° F.

In one embodiment, one RCPP resin is extruded at a temperature of about 500° F., while the second RCPP resin in extruded at a temperature of about 580° F.

In some embodiments, the RCPP resins are substantially the same. In other embodiments, the two RCPP resins have different properties.

In another example embodiment, extruding RCPP resins having different melt flow rates for the adjacent nanolayers in a nanolayer section of a film results in improved film performance.

In example embodiments, the melt flow rate for the RCPP resin extruded at the higher temperature ranges from about 2 g/10 min to about 12 g/10 min ($I_2$ at 230° C.).

In further embodiments, the melt flow rate for the RCPP resin extruded at the lower temperature ranges from about 8 g/10 min to about 20 g/10 min ($I_2$ at 230° C.).

In other embodiments, the melt flow rate for the RCPP resin extruded at the higher temperature is lower than the melt flow rate for the RCPP resin extruded at the lower temperature.

In a further example embodiment, RCPP resins having differing percentage co-monomers (e.g., differing percentages of ethylene) are extruded to the feedblock. In further embodiments, the percentage of ethylene in the respective RCPP resins ranges from about 0.7% to about 6% ethylene by weight.

In further embodiments, RCPP resins having different melting points are extruded to the feedblock. According to further embodiments, the melting points of the respective RCPP resins range from about 152° C. to about 163° C.

In still other example embodiments, a combination of differing melt flow rate and percent co-monomer RCPP resins in alternating nanolayers results in an increase in puncture resistance and elongation performance as compared to any single resin utilized in each of two or more adjacent layers simultaneously.

According to certain embodiments, the incorporation of RCPP resins into adjacent nanolayers with differing melt flow rates and differing melting points improves the film performance of the resulting structure relative to films wherein an RCPP polymer disposed in adjacent layers has the same or substantially the same melt flow rate or melting point.

In further example embodiments, resins used to produce the film layers other than the nanolayers include, but are not limited to, Ziegler Natta (ZN) catalyzed linear low density polyethylene (ZN-LLDPE), metallocene catalyzed linear low density polyethylene (m-LLDPE), polyethylenes, polyethylene copolymers, polyethylene terpolymers, polyethylene blends, polypropylenes, polypropylene copolymers, metallocene catalyzed polypropylenes, metallocene catalyzed polypropylene copolymers, and blends thereof In further embodiments, m-LLPPE resin comprises at least about 50% by weight of the total weight of the multi-layered film.

In example embodiments, the total thickness of the multi-layered film ranges from about 6 micron to about 40 micron. In further embodiments, the total thickness of the film ranges from about 10 micron to about 16 micron.

According to example embodiments, the nanolayer section(s) of the film range from about 12% to about 30% of the total film thickness. In further embodiments, wherein the film incorporates two nanolayer sections, each nanolayer section ranges from about 8% to about 15% of the total film thickness.

According to example embodiments, both migratory (i.e. polybutene polymers) and non-migratory polymers and/or additives such as waxes, rosins, ethylene vinyl acetates, ethylene methacrylates, ethylene methylmethacrylates, plastomers, elastomers, very low density copolymer polyethylenes, ultra-low density polyethylenes, copolymer polypropylenes, and blends thereof are used in a skin or "cling" layer of the film.

According to other example embodiments, a polybutene polymer with a Saybolt Universal Viscosity of 14,900 SUS at 99° C. with an average molecular weight of 2,060 is used as a cling agent in a skin or "cling" layer of the film. In further example embodiments, a polybutene polymer with a Saybolt Universal Viscosity of 3,000 SUS at 99° C. with an average molecular weight of 1,290 is used as the cling agent in a skin or "cling" layer of the film.

In example embodiments, various polymers are used in a skin or "release" layer of the film. In further embodiments, m-LLDPE, ZN LLDPE, polypropylenes, and blends thereof are used in the release layer. In other embodiments, polymers with inherent cling properties, including ultra-low or very low density polymers, are not used in the release layer of a film.

Turning now to FIG. 1, a stretch film 100 is shown, which incorporates a discrete layer 101 of RCPP resin. The discrete RCPP resin layer 101 is positioned between two layers 102 and 103 incorporating a high percentage of m-LLDPE resin. Any number of additional layers 104 incorporating m-LLDPE resin and/or other resins are anticipated in other embodiments. The compositions of the layers 102, 103, and 104 are selected based on the desired performance properties of the resulting film. In further embodiments, layers 102 and 103 do not themselves comprise a high percentage of m-LLDPE resin, but the overall composition of the film 100 comprises a high percentage of m-LLDPE resin.

Figure 2:
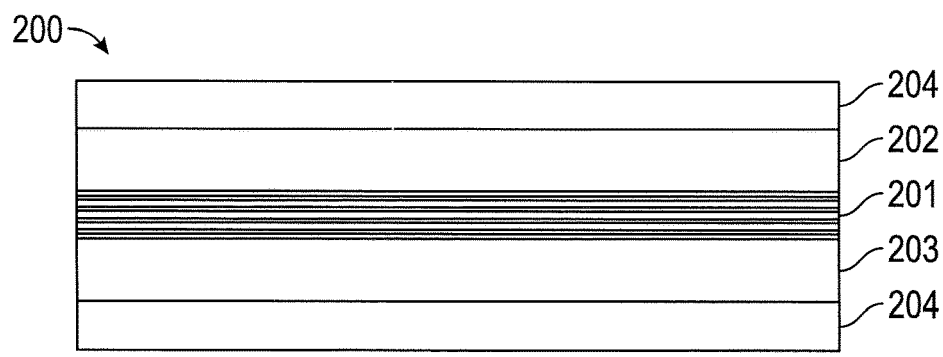
FIG. 2 illustrates a multi-layered stretch film incorporating a random copolymer polypropylene nanolayer structure, according to example embodiments.

Turning next to FIG. 2, a stretch film 200 is shown, which incorporates multiple nanolayers 201 of RCPP resins in a nanolayer section of a film. In certain embodiments, the RCPP nanolayers 201 are positioned between two layers 202 and 203 incorporating a high percentage of m-LLDPE resin, and the overall composition of the film 200 comprises a high percentage of m-LLDPE. Any number of additional layers 204 incorporating m-LLDPE and/or other resins are anticipated in other embodiments. The compositions of the layers 202, 203, and 204 are selected based on the desired performance properties of the resulting film. In further embodiments, layers 202 and 203 do not comprise a high percentage of m-LLDPE resin, but the overall composition of the film 200 comprises a high percentage of m-LLDPE resin.

Figure 3:
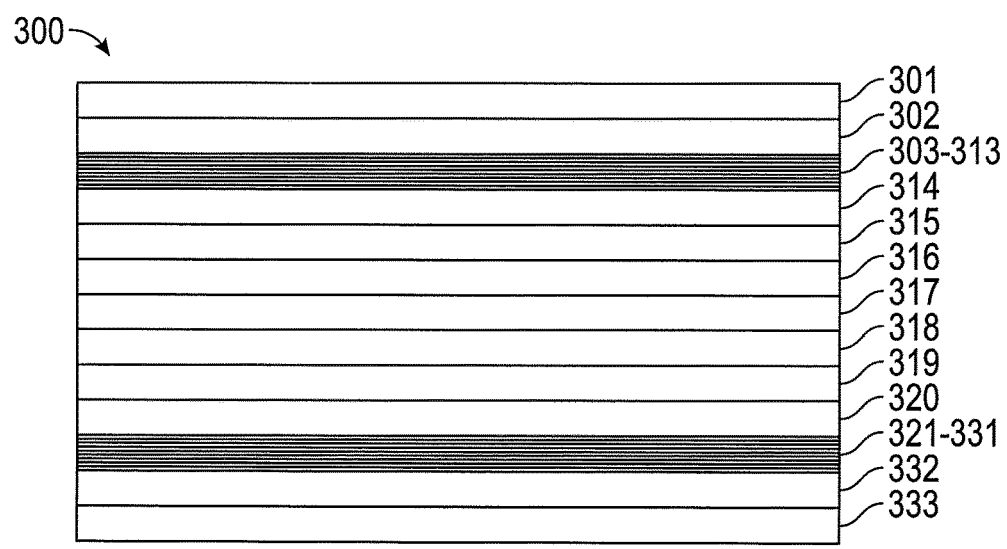
FIG. 3 illustrates a 33-layer stretch film incorporating random copolymer polypropylene nanolayer structures, according to example embodiments.

Turning next to FIG. 3, according to example embodiments, a 33-layer stretch film 300 is produced. Layers 301 and 333 are skin layers. Layer 301 includes a cling agent, while layer 333 is a release layer and does not comprise polymers with inherent cling properties. Layer 317 is the "core" layer and comprises a high percentage of m-LLDPE resin. In other embodiments, layer 317 comprises Ziegler Natta (ZN) catalyzed linear low density polyethylene (ZN LLDPE), metallocene catalyzed linear low density polyethylene (m-LLDPE), polyethylenes, polyethylene copolymers, polyethylene terpolymers, polyethylene blends, polypropylenes, polypropylene copolymers, metallocene catalyzed polypropylenes, metallocene catalyzed polypropylene copolymers, and blends thereof.

According to example embodiments, functional layers 302, 315, 319, and 332 comprise substantially the same resin or blend of resins. In further embodiments, functional layers 314, 316, 318, and 320 comprise substantially the same resin or blend of resins. The composition of the functional layers 302, 315, 319, and 332, and 314, 316, 318, and 320 are selected based on the desired properties of the resulting film for its particular application.

In still other embodiments, layers 303-313 and layers 321-331 comprise the alternating RCPP resin nanolayers. Nanolayers 303, 305, 307, 309, 311, and 313, and layers 322, 324, 326, 328, and 330 all comprise substantially the same resin. In other embodiments, nanolayers 304, 306, 308, 310, and 312, and layers 321, 323, 325, 327, 329, and 331 all comprise substantially the same resin.

In other embodiments, the 33-layer film 300 is produced using seven (7) extruders. Skin layer 301 is extruded using a first extruder, and skin layer 333 is extruded using a second extruder. Core layer 317 is extruded using a third extruder.

According to example embodiments, functional layers 302, 315, 319, and 332 are extruded using a fourth extruder. In further embodiments, functional layers 314, 316, 318, and 320 are extruded using a fifth extruder.

In still other embodiments, nanolayers 303, 305, 307, 309, 311, and 313, and nanolayers 322, 324, 326, 328, and 330 are extruded using a sixth extruder, while nanolayers 304, 306, 308, 310, and 312, and nanolayers 321, 323, 325, 327, 329, and 331 are extruded using a seventh extruder. The sixth extruder and seventh extruder extrude resins at different temperatures. In certain embodiments, the temperature gradient of the resins extruded from between the sixth and seventh extruder is about 80° F.

In other example embodiments, more than two extruders are used to extrude the nanolayer section(s). In further embodiments, more than two RCPP resins are used to produce the nanolayer section(s) of the film.

According to example embodiments, the feedblock has internal flow channels, created using flow distribution plates placed inside of the feedblock, for distributing the different resins for the film's layers to the combining adapter, wherein each of the polymer streams are joined together to form one layered stream of material, which, in turn feeds the die to be spread out onto a casting unit.

In example embodiments, flow distribution plates inside of the feedblock are movable, such that the desired layered configuration of the resulting film is customizable.

In an example embodiment, the chosen resins are extruded from the extruders to the feedblock inlets, and pass through channels created inside of the feedblock. In an example embodiment, each extruder extrudes to a different feedblock inlet. In further embodiments, each feedblock inlet connects to at least one channel inside of the feedblock, through which the resins flow to create the desired layered configuration.

In further embodiments, the resins flowing through the channels join in a combining adapter to form a layered stream. The layered stream exits the feedblock as one stream, and flows into a die to be spread out onto a casting unit, forming the multi-layered film web.

In further example embodiments, the feedblock and the flow distribution plates therein are configurable to alter any combination of the following: the location of the nanolayers, the location of the conventional layers, the total number of layers, the thickness of the layers, and the extrusion source of the layers.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof

The invention claimed is:

1. A multi-layered stretch film, comprising at least one nanolayer section, said nanolayer section comprising alternating substantially adjacent layers of a first random copolymer polypropylene (RCPP) resin and a second RCPP resin, further comprising at least one additional layer and a total film thickness ranging from about 6 micron to about 40 micron, and further comprising at least 50 percent by weight metallocene-catalyzed linear low density polyethylene (m-LLDPE).

2. The film of claim 1, wherein the total film thickness ranges from about 10 micron to about 16 micron.

3. The film of claim 1, further wherein said at least one nanolayer section ranges from about 12 percent to about 30 percent of the total film thickness.

4. The film of claim 1, further comprising two nanolayer sections, wherein each nanolayer section ranges from about 8 percent to about 15 percent of the total film thickness.

5. The film of claim 1, wherein said first RCPP resin has a melt flow rate ranging from about 8 g/10 min to about 20 g/10 min ($I_2$ at 230° C.) and said second RCPP resin has a melt flow rate ranging from about 2 g/10 min to about 12 g/10 min ($I_2$ at 230° C.), further wherein the melt flow rate of said second RCPP resin is greater than the melt flow rate of said first RCPP resin.

6. The film of claim 1, wherein said first RCPP resin and said second RCPP resin each comprise ethylene ranging from about 0.7 percent to about 6.0 percent ethylene by weight.

7. The film of claim 1, wherein said first RCPP resin and said second RCPP resin each have melting points ranging from about 152° C. to about 163° C.

8. The film of claim 1, wherein said at least one additional layer includes at least one of: Ziegler Natta (ZN) catalyzed linear low density polyethylene (ZN-LLPE), metallocene catalyzed linear low density polyethylene (m-LLDPE), polyethylenes, polyethylene copolymers, polyethylene terpolymers, polyethylene blends, polypropylenes, polypropylene copolymers, metallocene catalyzed polypropylenes, metallocene catalyzed polypropylene copolymers, and blends thereof.

* * * * *